(12) United States Patent (10) Patent No.: US 12,604,803 B2

Lenaerts et al. (45) Date of Patent: Apr. 21, 2026

(54) SYSTEM FOR MEASURING THRESHING LOSSES

(71) Applicant: CNH Industrial America LLC, New Holland, PA (US)

(72) Inventors: Bart Lenaerts, Zutendaal (BE); Thomas Mahieu, Vleteren (BE); Bart M.A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 726 days.

(21) Appl. No.: 17/943,303

(22) Filed: Sep. 13, 2022

(65) Prior Publication Data

US 2023/0084831 A1 Mar. 16, 2023

(30) Foreign Application Priority Data

Sep. 14, 2021 (EP) ..................................... 21196522

(51) Int. Cl.
*A01D 41/127* (2006.01)
*G01N 21/3581* (2014.01)
*G01N 21/85* (2006.01)

(52) U.S. Cl.
CPC ..... *A01D 41/1273* (2013.01); *G01N 21/3581* (2013.01); *G01N 21/85* (2013.01); *G01N 2201/067* (2013.01); *G01N 2201/1296* (2013.01)

(58) Field of Classification Search
CPC ........... A01D 41/1273; G01N 21/3581; G01N 21/85; G01N 2201/067; G01N 2201/1296; G01N 2021/8466
See application file for complete search history.

(56) References Cited

U.S. PATENT DOCUMENTS

| | | | |
|---|---|---|---|
| 2016/0327478 | A1 | 11/2016 | Hilscher et al. |
| 2021/0088691 | A1 | 3/2021 | Ferren et al. |
| 2021/0105941 | A1 | 4/2021 | Yu et al. |

FOREIGN PATENT DOCUMENTS

| | | | | |
|---|---|---|---|---|
| DE | 102020124656 A1 | 4/2021 | | |
| EP | 3797577 A1 * | 3/2021 | ............. | A01F 12/28 |
| WO | 2018204409 A1 | 11/2018 | | |

OTHER PUBLICATIONS

Extended European Search Report for European Application No. 211 965 22.3, dated Feb. 17, 2022, 8 pages.

(Continued)

*Primary Examiner* — Michelle M Iacoletti

(74) *Attorney, Agent, or Firm* — Buchanan Ingersoll & Rooney PC

(57) ABSTRACT

A method and system are provided for determining a threshing loss in a threshing system. The method includes irradiating a crop sample downstream at least a portion of a threshing system with electromagnetic waves having a frequency in a range of 0.1-10 THz, measuring a reflection and/or a transmission of the electromagnetic waves by the crop sample, establishing, based on the measured reflection and/or transmission, an at least two-dimensional terahertz image of the crop sample, identifying at least one ear in the terahertz image, identifying at least one grain kernel in the identified ear, and determining the threshing loss based on the identified grain kernel.

19 Claims, 3 Drawing Sheets

(56)           References Cited

OTHER PUBLICATIONS

Koch, M., "THz-Imaging: Fundamentals and Biological Applications", Part of the EUROPTO Conference on Terahertz Spectroscopy and Applications II, Munich, Germany, 1999 SPIE vol. 3828, pp. 202-208.

Lee, W.S.L., et al., "Assessing frost damage in barley using terahertz imaging", Optics Express, Oct. 12, 2020, vol. 28, No. 21, pp. 30644-30654.

Jiang, Y., et al., "Early detection of germinated wheat grains using terahertz image and chemometrics", Scientific Reports, Feb. 19, 2016, 6:21299, pp. 1-9.

* cited by examiner

SYSTEM FOR MEASURING THRESHING LOSSES

CROSS-REFERENCE TO RELATED APPLICATION

This application claims priority to European Application No. 21196522.3, filed Sep. 14, 2021, the content of such application being incorporated by reference herein in its entirety.

TECHNICAL FIELD

The present invention relates to a system and method for measuring threshing losses. The present invention further relates to an agricultural harvester comprising such a system.

BACKGROUND

Combine harvesters are complex agricultural machines that drive over a field to harvest grain crops, while separating the grain ears from the plant and the grain kernels from the ears. At the front of the combine harvester, a header is installed that is configured to cut the crop, take it from the field, and feed it into a crop processing system that separates the grain kernels from other parts of the harvested plants.

In a first stage of the crop processing system, the grain kernels are detached from the grain ears. At this threshing stage, the crop is typically ground between threshing elements on a rotating threshing drum and a threshing cage that partly surrounds the threshing drum. In modern combine harvesters, an orientation of the threshing elements or a clearance between the threshing drum and the threshing cage may be adaptable for adjusting the aggressiveness of the threshing process. Aggressive threshing requires more energy and thus leads to higher fuel consumption. Further, aggressive threshing may lead to broken grain kernels and increased wear of parts of the threshing system. When the threshing is not sufficiently aggressive, grain kernels are left behind in the grain ears and are disposed of together with the straw and other crop residue. The thus disposed grain kernels that do not end up in the grain tank are also called threshing losses. Optimal threshing settings achieve a balance between minimal threshing losses and low fuel consumption.

Commonly, threshing losses are estimated by the operator of the harvester who may now and then halt the combine harvester, get out, and inspect some of the threshing residue by picking the ears, rubbing these ears with his hands, and checking if there are still remaining grains left in the ears. If yes, the operator may increase the threshing aggressiveness. This manual assessment is labour intensive and time consuming. It further requires a lot of skill for the operator to be able to correctly and accurately assess the situation.

European patent application EP 3 797 575 A1, which is incorporated by reference, discloses an arrangement for measuring threshing losses. A separation rotor, provided downstream the main threshing section for separating the already detached grain kernels from other plant material, includes a small supplementary threshing section that is periodically activated. A grain sensor detects the grain kernels coming from this supplementary threshing section. While the thus detected grain kernels can be used as a measure for the threshing losses in the main threshing section, this supplementary threshing section does come with some disadvantages. The additional energy needed for the additional threshing stage leads to a higher fuel consumption, also when threshing losses are low and the additional threshing does not lead to a larger yield. Furthermore, the grain sensors used for determining the threshing losses will not only detect grain kernels released from the ears by the supplementary threshing section, but also lose grain kernels separated from the crop residue by the separator, thereby reducing the accuracy of the threshing loss measurement.

SUMMARY OF THE INVENTION

According to an aspect of the invention there is provided a new method for determining a threshing loss in a threshing system. The method comprises irradiating a crop sample downstream at least a portion of a threshing system with electromagnetic waves having a frequency in a range of 0.1-10 THz, measuring a reflection and/or a transmission of the electromagnetic waves by the crop sample, establishing, based on the measured reflection and/or transmission, an at least two-dimensional terahertz image of the crop sample, identifying at least one ear in the terahertz image, identifying at least one grain kernel in the identified ear, and determining the threshing loss based on the identified grain kernel.

Terahertz waves are known to be used in, e.g., medical imaging and security screening, and are useful because their ability to penetrate light fabrics and register density variations. Agricultural applications of terahertz radiation are less common, but known for, e.g., classifying seeds in a laboratorial setting. By using terahertz radiation to analyse the ears of the harvested crop, the inventors have made it possible to distinguish between fully threshed ears not containing any grain kernels and (partly) empty unthreshed ears with grain kernels that absorb a significant portion of the terahertz radiation. Inside or behind the threshing system, grain kernels in unthreshed ears are, however, not the only particles with a higher density. The use of terahertz radiation brings the additional advantages that it performs well in dusty environments and does not consume much power. In preferred embodiments, the electromagnetic waves have a frequency in the range of 0.1-6 THz, 0.1-3 THz, 0.5-3 THz, or 1-3 THz.

Standard terahertz imaging will equally detect lose grain kernels and some high-density parts of the straw and other crop residue. To ensure that only the unthreshed kernels are taken into account when establishing the threshing loss, the method according to the invention therefore includes a step of identifying the ears in the two-dimensional terahertz images first. The threshing losses determined using the method according to the invention are thus based on detected grain kernels in unthreshed ears only. As a consequence, the method for determining threshing losses according to the invention is more accurate than alternative methods that have been available so far.

Preferably, the method for determining a threshing loss is not limited to just the detection of unthreshed ears but further comprises determining, based on the measured reflection and/or transmission, a number of grain kernels in the identified ear. In addition to fully threshed and nonthreshed grain ears, the crop sample may further comprise partially threshed ears that still contain one or more grain kernels. By counting the number of grain kernels left behind in the identified ears, it is made possible to determine the efficacy of the threshing system with higher accuracy and to better adapt the operational settings of the threshing system to optimise, e.g., the threshing aggressiveness.

In an embodiment, the step of establishing the terahertz image comprises scanning a point sensor in two directions.

3

Alternatively, the two-dimensional terahertz image is established by scanning an array sensor in one direction, or a two-dimensional terahertz image sensor is used.

Identifying the ears in a moving and thick layer of crop may be a challenging task. A more accurate threshing loss measurement may be made possible by, before the step of irradiating the crop sample, diverting a portion of a crop stream through or downstream of the threshing system to a bypass section, thereby separating the crop sample from the crop stream. In the bypass section, a thinner and/or slower moving or stationary crop sample may be analysed.

An embodiment of the method according to the invention may further comprise a step of obtaining a second image of the sample using an image sensor for detecting radiation having a frequency of more than 10 THZ, and wherein the step of identifying at least one ear comprises identifying the at least one ear in the second image, aligning the terahertz image with the second image, and identifying the at least one ear in the terahertz image. When using a second image sensor for obtaining a second image of the same sample, using a different part of the electromagnetic spectrum, the detection of the ears in the crop sample may be improved. While terahertz radiation is very suitable for detecting grain kernels inside unthreshed (or partly unthreshed) ears, visible and/or infrared light may, e.g., be more suitable for detecting the ears in the crop sample. Further improvement may be achieved by combining image data from multiple different sensors to identify the locations in the images where ears can be found. When aligning the images obtained by different sensors, the search for non-threshed kernels in the terahertz image may be limited to just those locations where ears have been detected in the second image. This allows for a more efficient kernel detection algorithm and a better distinction between grain kernels inside unthreshed ears and lose grain kernels (or groups of lose grain kernels) elsewhere in the crop sample.

For the identification of ears and/or grain kernels in the different images obtained for performing the method according to the invention, trained neural networks and/or other artificial intelligence (AI) algorithms may be used.

According to a further aspect of the invention, a system is provided for determining a threshing loss in a threshing system, the system comprising at least one terahertz emitter for emitting electromagnetic waves having a frequency in a range of 0.1-10 THz, at least one terahertz sensor for measuring a reflection and/or a transmission of the electromagnetic waves, and a controller, operatively coupled to the terahertz emitter and the terahertz sensor and configured to perform a method as described above. The system may be provided as a separate system for use with various threshing systems or may be part of an agricultural harvester with a threshing system.

In an agricultural harvester the threshing system may comprise an axially aligned threshing and/or separation rotor and the at least one terahertz sensor may be provided adjacent an upper half of the threshing and/or separation rotor. Due to gravity and the mechanics of crop processed inside a threshing system, the layer of passing crop is typically thinner at the upper half of the threshing and/or separation rotor than at the bottom half. A thinner crop layer helps to improve the accuracy of the threshing loss measurement using the methods and system according to the invention. If the agricultural harvester comprises a straw beater, provided downstream of the threshing system, the at least one terahertz sensor may be provided adjacent a lower half of the straw beater.

Preferably, the controller in the agricultural harvester is configured to automatically adapt at least one operational setting of the threshing system in dependence of the determined threshing loss. This allows for establishing control loops that, e.g., minimise the threshing aggressiveness while ensuring low threshing losses.

BRIEF DESCRIPTION OF THE DRAWINGS

Embodiments of the invention will now be described by way of example with reference to the accompanying drawings.

DETAILED DESCRIPTION

Figure 1:
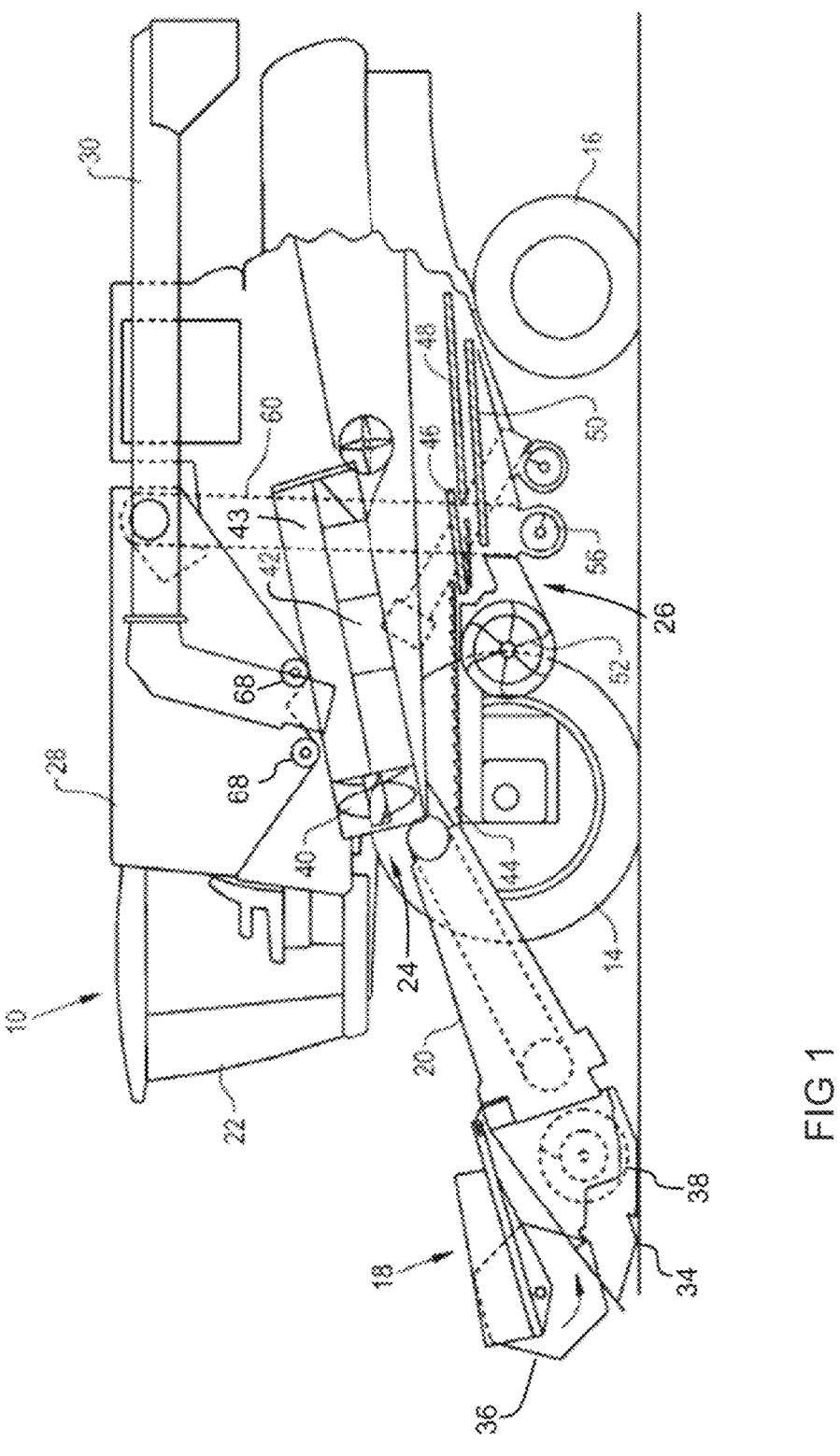
FIG. 1 shows a combine harvester wherein the method and system according to the invention may be advantageously used.

FIG. 1 shows an agricultural harvester in the form of a combine harvester 10, which generally includes front and rear round engaging wheels 14, 16, a header 18, a feeder 20, an operator cabin 22, a threshing and separation system 24, a cleaning system 26, a grain tank 28 and an unloading tube 30. It should be appreciated that while the agricultural harvester is shown as a combine harvester 10, the agricultural harvester according to the present invention may be embodied by any construction that allows for crop material to be harvested, such as a conventional combine (which does not have a rotor), rotary combine, hybrid combine, chopper harvester, etc.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separating system 24.

The threshing and separating system 24 is of the axial-flow type and comprises a threshing rotor 40 at least partially located and rotatable within a threshing concave 42. The threshing concave may take the form of a perforated concave. Grain from the severed crop is threshed and separated from the MOG by the action of the threshing rotor 40 within the threshing concave 42. Larger elements of MOG, such as stalks and leaves do not pass through the perforations in the threshing concave 42 and are discharged from the rear of the combine harvester 10. Grain and smaller elements of MOG (small MOG henceforth), such as chaff, dust and straw are small enough to pass through the perforations in the threshing concave 42 and are thence discharged from the threshing and separation system 24.

Grain and small MOG that has successfully passed the threshing and separating system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. Once in the grain tank 28, grain tank augers 68 at the bottom of the grain tank convey the cleaned grain laterally within the grain tank 28 to an unloading tube 30 for discharge from the combine harvester 10.

Figure 2:
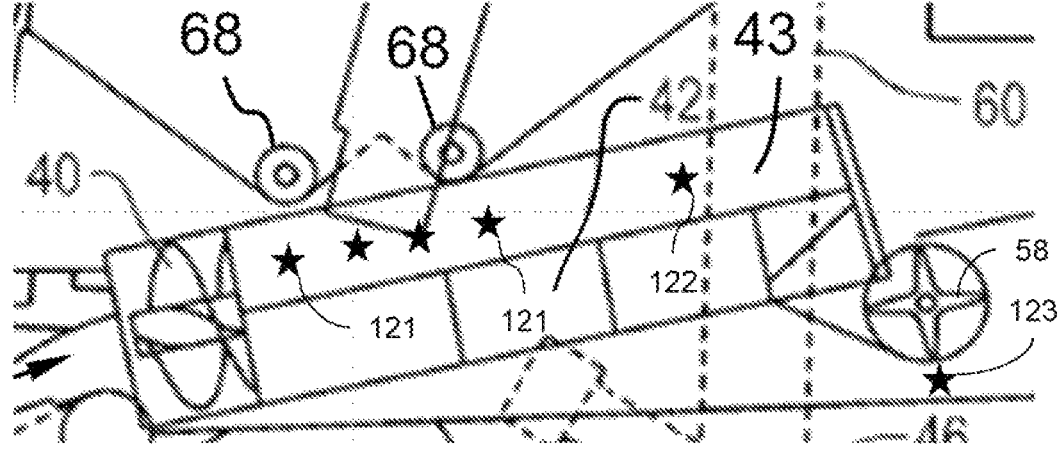
FIG. 2 shows a close-up of a portion of the combine harvester shown in FIG. 1, indicating some preferred locations for threshing loss sensors according to the invention.

FIG. 2 shows a close-up of a portion of the combine harvester 10 shown in FIG. 1, indicating some preferred locations for threshing loss sensors 121, 122, 123 according to the invention. A threshing rotor 40 as used in the exemplary combine harvester 10 of FIG. 1 is typically surrounded by a threshing concave 42 around its lower half and a rotor cover 43 around its upper half. The rotor covers 43 may comprise rotor vanes (not shown) for guiding the crop along a spiraling trajectory around and towards the rear end of the threshing rotor 40. The front part of the threshing rotor 40 typically comprises threshing elements that cooperate with the threshing concave 42 to detach the grain kernels from the ears of the harvested crop. The rear part of the rotor 40 comprises less aggressive separator elements that are configured to loosen the crop material, such that the grain kernels fall can fall down through the concave 42 while the crop residue is moved to the rear of the combine harvester 10 where it may be shredded and dispensed with. Just behind the rear of the threshing rotor 40, a straw beater 58 picks up the straw coming from the rear of the rotor 40 and pushes it towards an optional shredder and a straw hood from which the straw is either spread or dropped on the field.

Figure 3:
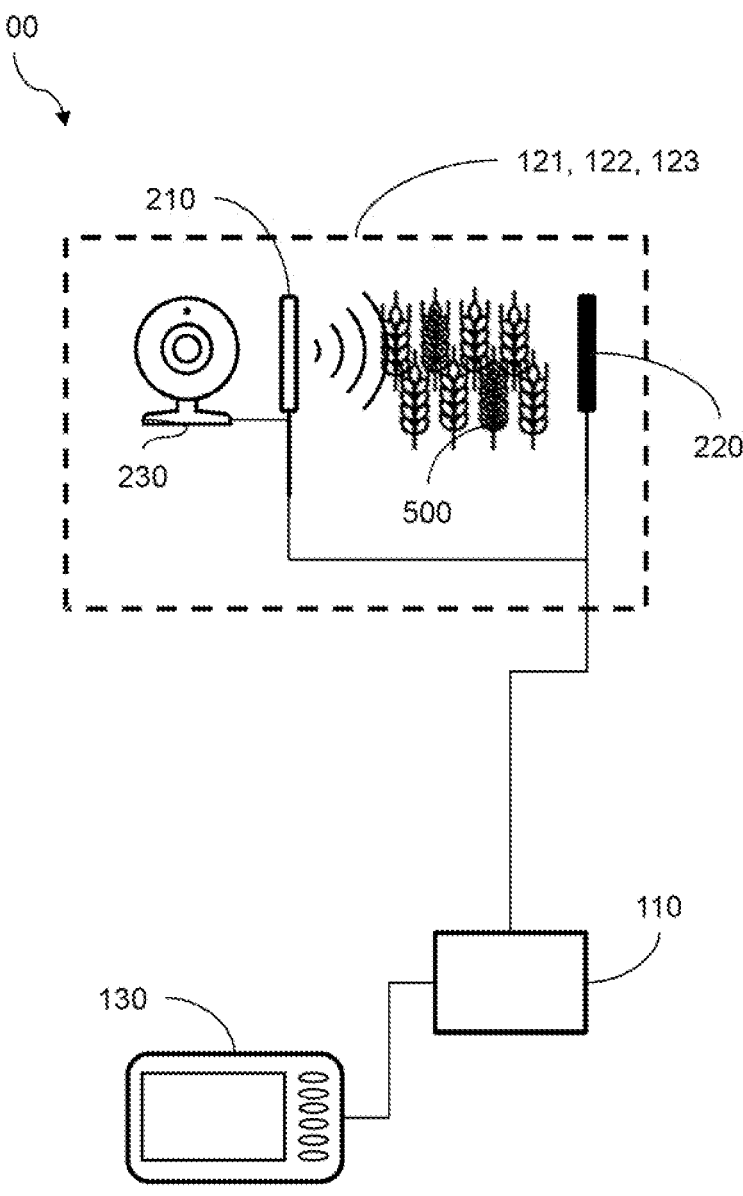
FIG. 3 schematically shows a system for measuring threshing losses for use in a combine harvester.

According to the invention, one or more threshing loss sensors 121, 122, 123 may be used to monitor the threshing losses in and behind the threshing and separation section of the combine harvester 10. The threshing loss sensors 121, 122, 123, which will be described in more detail below with reference to FIG. 3, are used to detect if any grain kernels are not properly threshed and thus left behind inside the ears. One of the technical challenges that needs to be overcome when measuring these threshing losses is that the ears only form a portion of a dense and moving layer of other parts of the harvested plants. To mitigate this challenge, the threshing loss sensors 121, 122, 123 are preferably placed at positions where the layer of crop material is relatively thin and/or loose. In FIG. 2, three of such suitable locations are indicated.

Multiple threshing loss sensors 121 may, e.g., be provided adjacent the upper half of the threshing section of the rotor 40. When providing threshing loss sensors 121 along the threshing section, it is made possible to monitor the threshing results along its full length. At the first one of the threshing sensors 121 in the threshing section, many ears still contain one or more grain kernels. At the last one of the threshing sensors 121 in the threshing section, threshing losses should be minimal or non-existing. Ideally, only the last one of the threshing sensors 121 in the threshing does not detect any unthreshed ears. When the threshing process has already been completed further upstream, the threshing may be too aggressive. Some threshing settings may then be adapted to reduce the threshing aggressiveness. For example, a concave clearance between the threshing rotor 40 and the threshing concave 42 may be increased, movable threshing elements on the rotor 40 or the concaves 42 may be moved, or a rotor speed may be adapted. When the last one of the threshing sensors 121 in the threshing section still detects unthreshed ears, the threshing aggressiveness may be increased.

Alternatively, or additionally, one or more threshing loss sensors 122 may be placed adjacent the upper half of the separation section of the rotor 40. Compared to the threshing section of the rotor 40, the separation section may have a slightly looser crop layer with fewer loose grain kernels therein, which may benefit the accuracy of the threshing loss measurement. Other threshing loss sensors 123 may, for example be provided adjacent the straw beater 58. It is to be noted that the possible locations for these threshing loss sensors 121, 122, 123 are not limited to examples provided in FIG. 2. The same or similar sensors may, e.g., be equally useful for detecting unthreshed ears in other parts of the combine harvester 10, in other agricultural machinery, or in a laboratory setting.

FIG. 3 schematically shows a system 100 for measuring threshing losses for use in a combine harvester 10. The system 100 comprises one or more threshing loss sensors 121, 122, 123 and a controller 110, coupled to the threshing loss sensors. The controller 110 may be a dedicated controller 110 for use with the system 100 for measuring threshing losses only, or its functionality may be partly or fully provided by a general-purpose electronic controller of the combine harvester 10. Furthermore, multiple threshing sensors 121, 122, 123 may be coupled to and controlled by a central and common controller 110, or each separate sensor 121, 122, 123 may comprise its own controller for controlling the sensor hardware and processing the measurements. Optionally, the controller 110 is coupled to a monitor 130 or other type of output device for communicating threshing losses measurement results to a user. The threshing losses may, e.g., be presented to the user as a number or percentage. Alternatively, the threshing losses may be visualised, for example by showing one or more grain ears with a number of kernels still present, which number depends on the measured threshing losses. Empty ears may, for example, indicate that no threshing losses are detected and partly or completely filled ears may respectively indicate low and high threshing losses. Recorded threshing losses may, e.g., be shown as numbers for showing current threshing losses, in graphs for showing how the threshing losses evolve over time, or in maps for showing how threshing losses have varied throughout the field.

Each threshing loss sensor 121, 122, 123 comprises at least one terahertz emitter 210 for emitting electromagnetic waves having a frequency in a range of 0.1-10 THz, and at least one terahertz sensor 220 for measuring a transmission of the electromagnetic waves. In other embodiments, the terahertz sensor 220 may be configured to measure a reflection of the electromagnetic waves at the crop sample 500 under investigation. Possible advantages of measuring reflection instead of transmission may be that the measurement may be affected less by the thickness of the crop layer, and that the sensor 121, 122, 123 may be more compact. The threshing loss measurements may also be based on a combination of both transmission and reflection.

The terahertz emitter 210 may, e.g., include a solid-state emitter or a horn antenna and may be adapted to a specific frequency in the 0.1-10 THz range. In preferred embodiments, the electromagnetic waves have a frequency in the range of 0.1-6 THz, 0.1-3 THz, 0.5-3 THz, or 1-3 THz. A combination of two or more different frequencies in the 0.1-10 THz range may be used to improve the accuracy or sensitivity of the threshing loss sensor 121, 122, 123. Other antenna types that may be used are, e.g., dipole antennas, photoconductive antennas, and on-chip antennas.

The threshing sensor 121, 122, 123 shown in FIG. 3 further comprises an optional image sensor or camera 230 for making images of crop samples 500 based on visible and/or infrared light. The terahertz emitter 210, the terahertz sensor 220, and the image sensor or camera 203, may be housed in a single unit or as two or more separate units. In the system 100 as a whole, one external camera 230 may be used in combination with two or more separate threshing loss sensors 121, 122, 123. Similarly, multiple terahertz sensors 220 may be used to detect the electromagnetic waves emitted by a single terahertz emitter 210.

Based on the measured reflection and/or transmission of the terahertz electromagnetic waves by the harvested crop inside the combine harvester 10, an at least two-dimensional terahertz image of the crop sample 500 is constructed. The two-dimensional image may be obtained by scanning a point sensor in two directions. Alternatively, the two-dimensional terahertz image may be established by scanning an array sensor in one direction, or by using a two-dimensional terahertz image sensor. When processing the terahertz image, image recognition algorithms are used for identifying ears in the imaged crop sample 500 and grain kernels that are left behind in the identified ears. Based on the thus identified unthreshed grain kernels, a threshing loss can be determined.

The step of identifying the ears in the terahertz images is important for allowing to make a distinction between individual, already detached, grain kernels and grain kernels that are still held by unthreshed ears. The ears may be identified in the terahertz image itself, for example by making use of the property of unthreshed grain kernels to be nicely aligned inside the ear. The detection of the ears in the tow-dimensional images can be improved by obtaining a second image of the sample 500 using an image sensor, such as the camera 230 shown in FIG. 3, for detecting radiation having a frequency of more than 10 THZ. When aligning the terahertz image with the second image, a combination of the information available from both images can be used to identify the location of any ears in the crop sample 500 with increased accuracy. While terahertz radiation is very suitable for detecting grain kernels inside unthreshed (or partly unthreshed) ears, visible and/or infrared light may, e.g., be more suitable for detecting the ears in the crop sample 500.

Further improvement may be achieved by combining image data from multiple different sensors to identify the locations in the images where ears can be found. When aligning the images obtained by different sensors, the search for non-threshed kernels in the terahertz image may be limited to just those locations where ears have been detected in the second image. This allows for a more efficient kernel detection algorithm and a better distinction between grain kernels inside unthreshed ears and lose grain kernels (or groups of lose grain kernels) elsewhere in the crop sample 500. For the identification of ears and/or grain kernels in the different images obtained for performing the method according to the invention, trained neural networks and/or other artificial intelligence (AI) algorithms may be used.

Further improvements in the accuracy of the threshing loss measurements may be realised by first diverting a portion of a crop stream through or downstream of the threshing system to a bypass section before trying to detect any unthreshed ears. When separating a crop sample 500 from the main crop stream, a thinner and/or slower moving or even stationary crop sample 500 can be analysed. So, while such a bypass section will introduce some additional mechanical complexity, it could allow to significantly improve the accuracy of the threshing loss measurements. Just as an example, the bypass section may be provided at the straw beater 58, where some of the crop residue may be diverted sidewards to a sensor for measuring threshing losses.

Preferably, the method for determining a threshing loss is not limited to just the detection of unthreshed ears but further comprises determining, based on the measured reflection and/or transmission, a number of grain kernels in the identified ear. In addition to fully threshed and non-threshed grain ears, the crop sample 500 may further comprise partially threshed ears that still contain one or more grain kernels. By counting the number of grain kernels left behind in the identified ears, it is made possible to determine the efficacy of the threshing system with higher accuracy and to better adapt the operational settings of the threshing system to optimise, e.g., the threshing aggressiveness.

What is claimed is:

1. A method for determining and adapting to a threshing loss in a threshing system, the method comprising:

irradiating a crop sample downstream of at least a portion of the threshing system with electromagnetic waves having a frequency in a range of 0.1-10 THz, measuring a reflection and/or a transmission of the electromagnetic waves by the crop sample, establishing, based on the measured reflection and/or transmission, an at least two-dimensional terahertz image of the crop sample, determining the threshing loss by counting grain kernels contained within an ear and appearing in the two-dimensional terahertz image, and automatically adapting at least one operational setting of the threshing system in dependence of the determined threshing loss.

2. The method for determining and adapting to a threshing loss as claimed in claim 1, wherein the step of establishing the terahertz image comprises scanning a point sensor in two directions.

3. The method for determining and adapting to a threshing loss as claimed in claim 1, wherein the step of establishing the terahertz image comprises scanning an array sensor in one direction.

4. The method for determining and adapting to a threshing loss as claimed in claim 1 further comprising, before the step of irradiating the crop sample, the step of diverting a portion of a crop stream either through or downstream of the threshing system to a bypass section, thereby separating the crop sample from the crop stream.

5. The method for determining and adapting to a threshing loss as claimed in claim 1, further comprising obtaining a second image of the sample using an image sensor for detecting radiation having a frequency of more than 10 THZ and aligning the terahertz image with the second image.

6. The method for determining and adapting to a threshing loss as claimed in claim 5, wherein the image sensor is either an infrared sensor or a visual spectrum sensor.

7. A non-transitory computer readable medium bearing a program comprising instructions executable by a computer which instructions, when executed by the computer, cause the computer to carry out the method as claimed in claim 1.

8. The method for determining and adapting to a threshing loss as claimed in claim 1, wherein the at least one operational setting is a clearance between a threshing rotor and a threshing concave of the threshing system.

9. The method for determining and adapting to a threshing loss as claimed in claim 1, wherein the at least one operational setting is a speed of a threshing rotor of the threshing system.

10. The method for determining and adapting to a threshing loss as claimed in claim 1, wherein the at least one operational setting is a position of a moveable threshing element on a threshing rotor or a threshing concave of the threshing system.

11. The method for determining and adapting to a threshing loss as claimed in claim 1, wherein the determining step does not comprise counting grain kernels that are detached from the ears.

12. A system for determining and adapting to a threshing loss in a threshing system, the system comprising:

at least one terahertz emitter for emitting electromagnetic waves having a frequency in a range of 0.1-10 THz onto a crop sample, at least one terahertz sensor for measuring a reflection and/or a transmission of the electromagnetic waves by the crop sample, and a controller, operatively coupled to the terahertz emitter and the terahertz sensor, that is configured for:

(i) establishing, based on the measured reflection and/or transmission, an at least two-dimensional terahertz image of the crop sample, (ii) determining the threshing loss by counting grain kernels contained within an ear and appearing in the two-dimensional terahertz image, and (iii) automatically adapting at least one operational setting of the threshing system in dependence of the determined threshing loss.

13. An agricultural harvester comprising a threshing system and the system of determining and adapting to a threshing loss as claimed in claim 12.

14. The agricultural harvester as claimed in claim 13, wherein the threshing system comprises an axially aligned threshing and/or separation rotor and wherein the at least one terahertz sensor is disposed adjacent an upper half of the threshing and/or separation rotor.

15. The agricultural harvester as claimed in claim 13, further comprising a straw beater disposed downstream of the threshing system, wherein the at least one terahertz sensor is disposed adjacent a lower half of the straw beater.

16. The agricultural harvester as claimed in claim 13, wherein the at least one operational setting is a clearance between a threshing rotor and a threshing concave of the threshing system.

17. The agricultural harvester as claimed in claim 13, wherein the at least one operational setting is a speed of a threshing rotor of the threshing system.

18. The agricultural harvester as claimed in claim 13, wherein the at least one operational setting is a position of a moveable threshing element on a threshing rotor or a threshing concave of the threshing system.

19. The agricultural harvester as claimed in claim 13, wherein in determining the threshing loss, grain kernels that are detached from the ears are not counted.

* * * * *